Patented July 16, 1929.

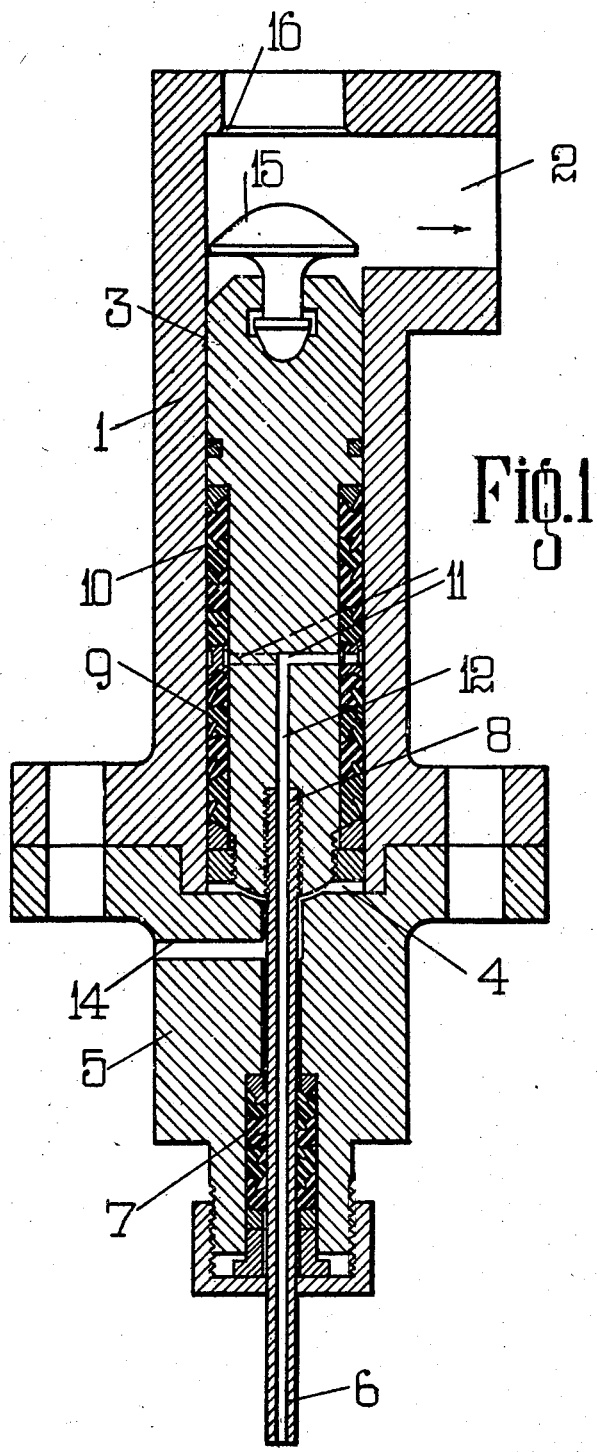

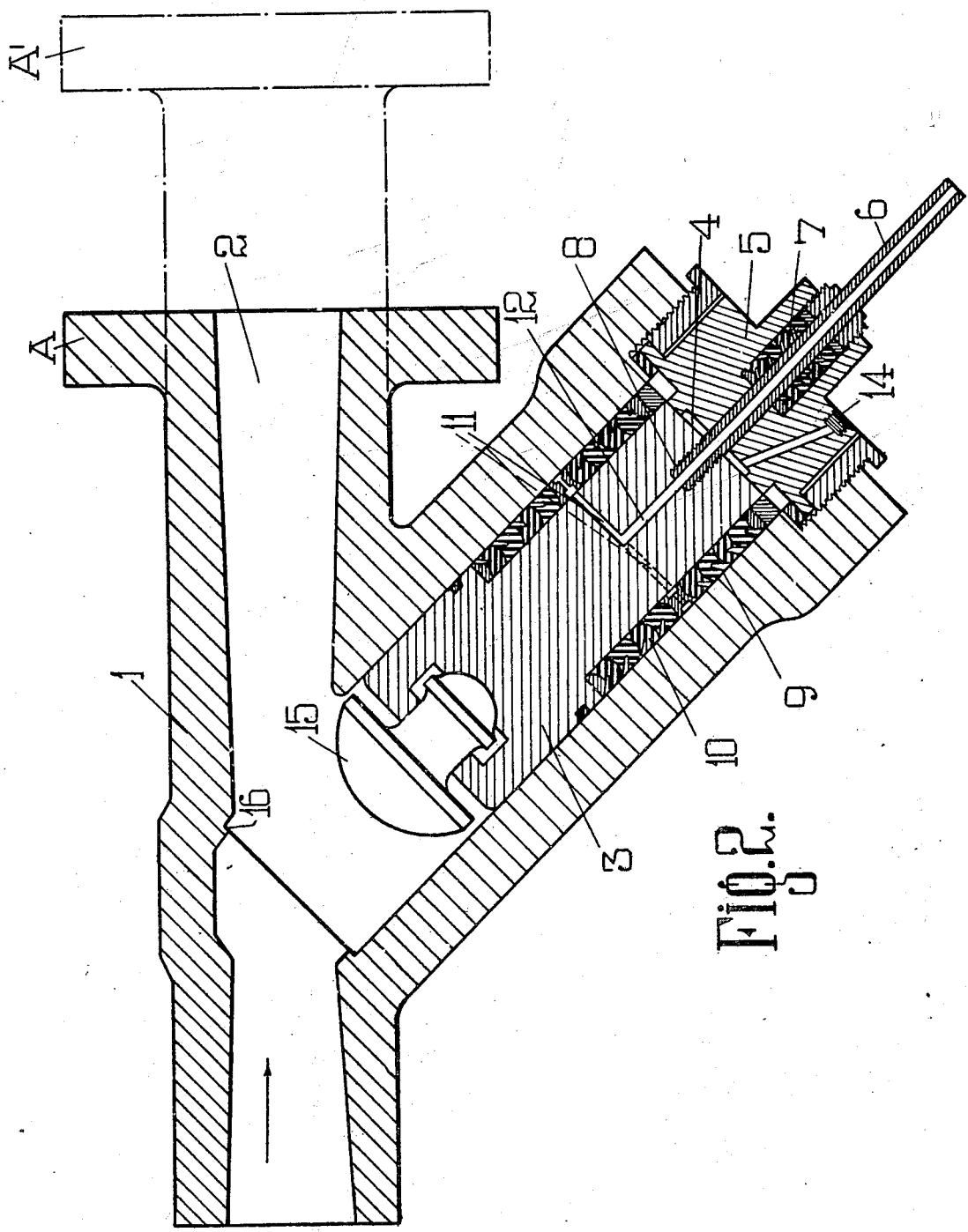

1,721,204

UNITED STATES PATENT OFFICE.

AUBREY FREDERIC BURSTALL, OF STOCKTON-ON-TEES, ENGLAND, ASSIGNOR TO SYNTHETIC AMMONIA & NITRATES LIMITED, OF STOCKTON-ON-TEES, ENGLAND.

VALVE.

Application filed December 7, 1926, Serial No. 153,173, and in Great Britain April 29, 1926.

This invention relates to fluid operated valves for use at high pressures and consists in a simplified arrangement which presents marked advantages over known types. The design of the apparatus also permits of the incorporation of certain novel and useful features, as hereinafter described and claimed.

The invention consists in a fluid actuated valve for conduits carrying fluids under high pressure comprising a casing containing a movable member adapted to engage a fixed seat attached to or formed on the conduit walls, said member being exposed on one side to the fluid in the conduit and on the other side to the actuating fluid at a high pressure and having a packing for each fluid arranged between it and the common casing which is of the same diameter throughout the travel of the said movable member.

The invention further consists in a fluid operated stop valve for high pressure fluids comprising a casing having a valve seat arranged on its outer walls to be engaged by a valve head which lies wholly out of the fluid path through the said valve casing when the valve is open, the valve head being positively connected to an operating piston guided in the casing and provided with two sets of expending packing oppositely disposed to the fluid through the valve and to the operating fluid respectively whilst a connection is made between the space between the said oppositely disposed packings and a source of lower pressure than either the fluid through the valve or the operating fluid to obtain a high pressure difference on the said two sets of packings.

Further features will be apparent from the following description and claims.

The invention can be applied equally to the sealing of a straight-through passage or a right-angle passage, or any other passage, the only requisite being that a suitable seat may be formed for the valve head. For high pressure work the sealing engagement in the valve should be made along a single circular line contact.

By way of example two applications of our invention are represented in the accompanying diagrams, in which Figure 1 represents a sectional elevation of an elbow-valve and Figure 2 represents a sectional elevation of a straight-through valve.

In Figure 1, 1 is the valve casing and 2 the conduit through which fluid under pressure, e. g., air, is flowing (either way). 3 is the valve piston or plunger sliding in the casing 1. The plunger carries a head 15 preferably of the loose type and made a special hard steel which is adapted to engage a seat 16 on the conduit walls. The diagram shows the valve in the open position. In the closed position the plunger 3 has moved upwards so as to leave a space 4 which, being directly fed by a high pressure oil supply 14, is then full of oil. A close fit of the plunger within the casing is ensured by means of a number of fibre packing rings 9 and 10 located in the annual recess with which the plunger is provided. The packing rings are of such a section that when pressure is applied to the gland the rings are forced tightly against the valve casing. For instance cup-washers or washers of U-shaped section may be employed. Those in the lower half of the recess are arranged with their concave surfaces exposed to the oil pressure, while those in the uper half are arranged in the opposite sense so that their surfaces are exposed to the gas pressure. The packing in the annual recess is thus divided into two parts, and at the junction thereof a radial channel or channels 11 is or are provided in the plunger so that the gland may be put into communication with a central hole 12 drilled axially through the lower half of the plunger. The channel 12 communicates with the atmosphere by way of the narrow-bore tube 6, which is firmly socketed into the plunger 8 so as to stop oil leaking from the high pressure chamber 4. The tube 6 is carried through the valve-end-casing via the gland 7 and shares the movements of the plunger 3. Its position therefore serves to indicate whether the valve is open or shut.

The operation of the valve is as follows:—

The tube 14 serves both as inlet and outlet for high-pressure oil. When it is desired to close the valve oil is admitted to the chamber 4 at a pressure sufficiently higher than the gas pressure in the conduit 2. The excess pressure required to operate the plunger will vary of course with the gas pressure, for the higher this is the more tightly will the packing rings 9 and 10 be forced against the plunger and the valve casing, and the greater will be the friction between the rings and the casing. The excess pressure required to operate the valve satisfactorily under given conditions of gas pressure can easily be ascertained by trial. If the gas pressure is say 200 atmospheres then a suitable oil pressure will be 250 atmospheres. On application of the oil pressure the plunger 3 immediately moves to the closed position. When it is desired to open the valve the oil pressure is released, and the gas pressure acting on the valve head (if the gas flows in the direction of the arrows) or on the exposed parts of the plunger (if the gas flow is in the reverse direction) causes the valve to open. In order that in the latter case a force may be available at least equal to that used for closing the valve, the valves must be so designed that the product of the gas pressure and the difference in effective area between a normal section of the plunger and the valve seat is at least equal to the excess oil pressure multiplied by the cross-sectional area of the plunger. Thus if the gas pressure is 200 atmospheres and the oil pressure 250 atmospheres the effective cross-sectional area of the plunger should be about $\frac{5}{4}$ of that of the valve seat.

It will be seen that as a result of the provision of an outlet to atmospheric pressure in the middle of the gland, the pressure drops along both the upper and lower packings are made as large as possible—thus ensuring a very tight fit of the packing against the plunger and the valve casing. Moreover if any oil leaks past the lower rings it cannot creep further up the casing and eventually contaminate the gas, for as soon as it reaches the radial channels communicating with the passage 12 it must be driven into the said passage and eventually through the tube 6 to a suitable exit. Any oil or gas leakage through the tube 6 shows that the packing rings are becoming worn and need replacement.

In Figure 2 the same principles are shown applied to a straight-through valve, the parts being numbered as before. In this case the valve-end casing is of a different type, for the following reason. The flanged joints employed in high pressure pipes are always bulky and if the valve casing met the conduit at an acute angle, say 30°, it would be necessary to prolong the valve forging to a point A¹ so that the flange should not interfere with that on the valve casing. By adopting a screwed plug joint on the valve casing we are enabled to make room for the flange at A, with a consequent reduction in size of the valve forging.

The appended claims define combinations of features which we do not claim individually. We obtain special advantages by combining the features as specified for a high pressure valve, inasmuch as we are enabled to build a valve of greatly increased simplicity since the valve casing can be made from one forging and the necessary machinery of the forging is rendered very simple. Moreover the forging required is smaller than for other known types of high pressure valve made to perform the same duty.

I declare that what I claim is:

1. A fluid operated valve for conduits carrying fluids comprising a casing, a movable member sliding in said casing and exposed on one side to the fluid in the conduit and on the other side to the actuating fluid at a higher pressure, a seat attached to the conduit walls and adapted to be engaged by said member, a packing for each fluid arranged between said member and said casing and a passage communicating from the space between said packings and the atmosphere through said movable member.

2. A fluid operated stop valve for conduits carrying fluid comprising a casing, a valve seat arranged on the inner wall of said casing, a valve head adapted to engage said seat, said valve head lying wholly out of the fluid path through said casing when the valve is open, a piston including a channel and guided in said casing, said piston operating said valve head and positively connected thereto, two oppositely disposed sets of packing on said piston, said channel connecting the space between said oppositely disposed packings and a source of lower pressure than either the controlled fluid or the actuating fluid to obtain a high pressure difference on each of the two sets of packing.

3. A fluid operated valve for conduits carrying fluid, comprising a casing, a movable member containing a channel, said member exposed on one side to the fluid in the conduit and on the other side to the actuating fluid at a higher pressure, said member sliding in said casing which is of uniform diameter throughout the travel of said member, a seat formed on the conduit walls, and adapted to be engaged by said member, two expansible packings presenting their expansible faces to the opposing pressures in opposite directions, said channel forming an outlet from between said packings to a source of substantially lower pressure.

4. A fluid operated valve for conduits carrying fluid, adapted to close a straight through passage, comprising a casing having a screw plug joint, a movable member exposed on one side to the fluid in the conduit and on the other side to the actuating fluid at a higher pressure, said member sliding in said casing which is of uniform diameter throughout the travel of said member, a fixed seat attached to the conduit walls and adapted to be engaged by said member, and a packing for each fluid arranged between said member and said casing.

5. A fluid operated valve for conduits carrying fluids under pressures of at least 50 atmospheres comprising a casing in the form of a forging, a movable member sliding in said casing and exposed on one side to the fluid in the conduit and on the other side to the actuating fluid at a higher pressure, a seat attached to the conduit walls and adapted to be engaged by said member, a packing for each fluid arranged between said member and said casing and a passage communicating from the space between said packings and the atmosphere through said movable member.

In witness whereof I have signed my name this 17th day of November, 1926.

AUBREY FREDERIC BURSTALL.